United States Patent [19]

Zhang et al.

[11] Patent Number: 5,358,800
[45] Date of Patent: Oct. 25, 1994

[54] ACTIVE MATERIAL OF HYDROGEN STORAGE ALLOY ELECTRODE

[75] Inventors: Yunshi Zhang, North Village; Deying Song, Southwest Village; Youxiao Chen, Tianjin; Jun Chen; Huatang Yuan, both of Southwest Village; Genshi Wang, North Village; Zuoxiang Zhou, North Village; Xuejun Cao, North Village; Yufeng Jin, North Village, all of China

[73] Assignee: Nan Kai University, Tianjin, China

[21] Appl. No.: 91,572

[22] Filed: Jul. 15, 1993

[30] Foreign Application Priority Data

Jul. 16, 1992 [CN] China ............... 92104667.7

[51] Int. Cl.$^5$ ............................................. H01M 4/02
[52] U.S. Cl. .................................. 429/59; 429/101; 429/223; 429/229; 428/655; 428/656; 428/680; 420/900
[58] Field of Search ............... 429/223, 229, 101, 59; 420/900; 428/655, 656, 680

[56] References Cited

U.S. PATENT DOCUMENTS

| | | | |
|---|---|---|---|
| 4,623,597 | 11/1986 | Sopru et al. | 429/101 |
| 4,952,465 | 8/1990 | Harris et al. | 429/60 |
| 4,981,741 | 1/1991 | Kawata et al. | 428/64 |
| 5,242,656 | 9/1993 | Zhang et al. | 420/217 |

FOREIGN PATENT DOCUMENTS

| | | |
|---|---|---|
| 0197680 | 10/1986 | European Pat. Off. . |
| 0293660 | 12/1988 | European Pat. Off. . |
| 0477461 | 4/1992 | European Pat. Off. . |

*Primary Examiner*—Prince Willis, Jr.
*Assistant Examiner*—M. Nuzzolillo
*Attorney, Agent, or Firm*—Lowe, Price, LeBlanc & Becker

[57] ABSTRACT

This invention relates to a hydrogen storage active material comprising an alloy having the formula $MmNi_{5-x-y-z}Zn_xQ_yR_z$, in which Q=Al, Ca and Sr, R=Li, Na and K, $0<x\leq1$, $0<y\leq0.8$ and $0<z\leq1$. An alloy phase of zinc is formed between the surface coating and the alloy base after treatment of the alloy powder by surface plating. As a result, the electrochemical capacity as well as the life of the hydrogen storage alloy electrode formed is increased significantly while the cost is greatly reduced by employing Zn.

9 Claims, No Drawings

ACTIVE MATERIAL OF HYDROGEN STORAGE ALLOY ELECTRODE

BACKGROUND OF THE INVENTION

1. Technical Field

The present invention relates to a hydrogen storage material, and more particularly, to a hydrogen storage electrode comprising the active hydrogen storage material.

2. Background Art

The study of rare-earth hydrogen storage alloys began with $LaNi_5$. The crystal lattice of $LaNi_5$ expands dramatically during the hydrogen charge-discharge process, thereby resulting in a loss of the alloy's capacity for storing hydrogen. Over the past twenty years, efforts have been made to find suitable active materials for hydrogen storage electrodes. The ideal material for hydrogen storage electrodes should have (1) an effective electrochemical capacity, (2) an appropriate equilibrium decomposition pressure of hydrogen, (3) a prolonged life of charge-discharge, (4) corrosion resistance, (5) excellent electrocatalysis and (6) inexpensive raw materials.

In order to obtain a suitable hydrogen storage material, efforts have been made to improve the composite structure of hydrogen storage alloy electrodes, as by adding Mn to the conventional $LaNi_5$ alloy to reduce the plateau pressure, adding Al to increase its corrosion resistance, and adding Co to reduce the expansion of the crystal lattice. The life of hydrogen storage alloy electrodes is prolonged by the addition of Mn, Al and Co. The charge-discharge life-cycle has been increased by such additions from less than twenty cycles to about a hundred cycles. (JP01231268; J Materials Science, 1983, 18, 321–24; Progress in Batteries & Solar Cells, 1989, 8). However, to date, materials for hydrogen storage electrodes have not been reported in any literature with which a secondary battery has met the IEC standard with a life of up to 500 cycles. Although the addition of Co prolongs the life of the electrode, it falls far short of reaching the IEC standard. Moreover, Co is a very expensive raw material.

SUMMARY OF THE INVENTION

An object of the present invention is to provide an active alloy for hydrogen storage electrodes containing Zn. After treatment of the surface of the Zn-containing alloy, the IEC standard is exceeded and the cost of the raw materials and production of electrodes is reduced.

Another object of the invention is to provide a hydrogen storage electrode with a Zn-containing active material.

According to the present invention, an active hydrogen storage material is formulated comprising an alloy base having a formula:

$$MmNi_{5-x-y-z}Zn_xQ_yR_z,$$

wherein Fun is a mischemetal; Q is Al, Ca or Sr; R is Li, Na or K: $0 < y \leq 1, 0 < y < 0.8, 0 < z \leq 1$, and a Ni-P metallic compound coated on the alloy base.

DETAILED DESCRIPTION OF THE INVENTION

According to the present invention, a novel active hydrogen storage alloy is formulated having a general formula:

$$MmNi_{5-x-y-z}Zn_xQ_yR_z,$$

wherein $0 < x \leq 1, 0 < y \leq 0.8$ and $0 < z \leq 1$. Mm is a mischemetal or a lanthanum-rich mischemetal. It is preferred that Mm is free from heavy rare-earth elements.

In the alloy Q is Al, Ca or St. Q is a component most of which is dispersed at the crystal boundary, interface of the phases and the defects of the alloy when the amount of Q is larger than its solid solubility in a $LaNi_5$ alloy. Because Q easily oxidizes, the formed oxides may be deposited at the crystal boundary, interface of the phases and the defects of the alloy. These oxides serve as excellent protective films against further oxidation, which provides good corrosion resistance.

In the formula, R is Li, Na or K. R may increase the activity of the alloy which in turn increases the electrochemical capacity of the hydrogen storage electrode made with the alloy. It is preferred according to the invention that Q is Al, and R is Li in the active material. It is also preferred that x is from 0.5 to 0.8, y is from 0.2 to 0.5, and z is from 0,005 to 0.2.

According to the present invention, a powder alloy with the above-mentioned formula, is further coated with a Nickel and Phosphorous (Ni-P) metallic compound. The atomic percentage of the metallic compound is from 93 to 97% of Ni and from 3 to 7% of P.

The active hydrogen storage material is prepared by mixing all five components of the formula in a predetermined ratio, melting the resulting mixture to form cast ingot of the alloy, grinding the alloy ingot to obtain an alloy powder having a particle size of 250 to 600 mesh, preferably 300 to 400 mesh, and coating the powder alloy with a Ni-P metallic compound to the thickness of 1 to 4 μm, preferably, 2 to 3 μm by a conventional chemical plating method.

During the above-mentioned coating process, because Ni is a typical face-centered cubic structure, it forms an integrated film after being deposited on the surface of the alloy base. During the above-mentioned coating process, Zn is diffused toward the surface of the alloy forming a metallic compound with Ni chemically deposited on the surface of the alloy. Therefore, the alloy base is connected to the surface coating via Zn to form an alloy phase. As a result, the surface Ni-P metallic compound is firmly connected to the alloy base. Thus, not only the loss of effectiveness of a hydrogen storage alloy caused by the expansion of the crystal lattice during the hydrogen charge-discharge cycle can be reduced, as by adding Co, but the film so formed has excellent electrical and thermal conductivities, good plastic deformation resistance and corrosion resistance.

A hydrogen storage electrode is prepared by conventional methods using the coated alloy of the invention as an active material of the hydrogen storage electrode. The hydrogen storage alloy electrode exhibits an increased electrochemical capacity and a prolonged cycle life. The capacity of a battery assembled with the electrode of the present invention reduces only by about 6 percent after 500 charge-decharge cycles, which is far below the IEC standard.

In accordance with the present invention, an alkali battery includes a hydrogen storage alloy electrode which incorporates the active material of the invention.

Example 1

An alloy material of $MmNi_4Zn_{0.5}Al_{0.3}Li_{0.2}$ obtained from a vacuum induction furnace was pulverized into an alloy powder of 300–400 mesh in a vibration mill. The powdery alloy was coated with a Ni-P metallic compound in 2–3 μm on its surface by a conventional chemical plating method. The atomic percentage of the metallic compound used was 95% of Ni and 5% of P.

After coating, the powdery alloy was dried under vacuum at 80–100° C., and maintained at that temperature for 18 hours. Then the temperature was raised to 150° C. where the powder alloy was subjected to diffusion annealing for 15 hours. 6.5g of the surface-coated powder alloy was then mixed with 2% by weight of PVA (Polyvinyl Acetate) in a ratio of 85:15 to form a paste. An anode of 8.5×4cm was made by applying the paste to a foam nickel plate with thickness of 1 mm. A measurement was made of the electrochemical capacity of the anode with nickel oxide as a cathode, nonwoven nylon as a separator, and Hg/HgO as a reference electrode. The results are shown in Table 1.

Example 2

A anode with an active material of $MmNi_{3.8}Zn_{0.7}Al_{0.3}Li_{0.2}$ was made by a process as described in Example 1.

An A—A type 5# battery was assembled with nickel oxide as cathode. The electrochemical capacity measured is shown in Table 2.

TABLE 1

| The Electrochemical Capacity of Novel Zn-Containing Material of Hydrogen Storage Alloy Electrode (mAh/g) | | |
|---|---|---|
| Discharge Multiple Rate | $MmNi_4Zn_{0.5}Al_{0.3}Li_{0.2}$ Capacity | $MmNi_{3.8}Co_{0.5}Mn_{0.5}Al_{0.2}$ Capacity |
| 0.2 C | 288 | 284 |
| 1 C | 262 | 259 |
| 3 C | 210 | 208 |

TABLE 2

| Comparison of Electrochemical Capacity of A-A type Battery of Two Kind of Alloy Materials | | |
|---|---|---|
| Discharge Multiple Rate | $MmNi_{3.8}Zn_{0.7}Al_{0.3}Li_{0.2}$ Capacity (mAh) | $MmNi_{3.8}Co_{0.5}Mn_{0.5}Al_{0.2}$ Capacity (mAh) |
| 0.2 C | 1180 | 1100 |
| 1 C | 1060 | 1060 |
| 3 C | 1002 | 940 |
| 5 C | 948 | 906 |

What is claimed is:

1. An active hydrogen storage material for use in preparing a hydrogen storage electrode, comprising an alloy base having the formula:

$$MmNi_{5-x-y-z}Zn_xQ_yR_z,$$

wherein Mm is a mischemetal; Q is Al, Ca or Sr; R is Li Na or K; $0<x\leq 1$, $0<y\leq 0.8$, $0<z\leq 1$, and Ni-P metallic compound coated on the alloy base.

2. An active hydrogen storage material according to claim 1, wherein the atomic percentage of the Ni.-P metallic compound is from 93 to 97% of Ni, and from 3 to 7% of P.

3. An active hydrogen storage material according to claim 1, wherein Q is Al.

4. An active hydrogen storage material according to claim 1, wherein R is Li.

5. An active hydrogen storage material according to claim 1, wherein x is from 0.5 to 0.8, y is from 0.2 to 0.5, and z is from 0.2 to 0.05.

6. An active hydrogen storage material according to claim 1, wherein Q is Al, R is Li, x is from 0.5 to 0.8, y is from 0.2 to 0.5 and z is from 0.05 to 0.2.

7. An active hydrogen storage material according to claim 1, in the form of a powder comprising particles of the base alloy coated with the Ni-P metallic compound.

8. A hydrogen storage electrode comprising the active hydrogen storage material of claim 1.

9. A hydrogen storage electrode comprising the active hydrogen storage material of claim 7.

* * * * *